United States Patent [19]

Nothaft

[11] 4,447,872
[45] May 8, 1984

[54] ALARM DATA CONCENTRATION AND GATHERING SYSTEM

[75] Inventor: Eugene M. Nothaft, Shoreview, Minn.

[73] Assignee: Minnesota Mining and Manufacturing Company, St. Paul, Minn.

[21] Appl. No.: 199,029

[22] Filed: Oct. 20, 1980

[51] Int. Cl.³ .............................................. G06F 3/04
[52] U.S. Cl. ................................ 364/200; 340/825.26
[58] Field of Search ... 364/200 MS File, 900 MS File; 340/825.26; 179/2 AM, 18 BE, 90 BD

[56] References Cited

U.S. PATENT DOCUMENTS

| | | | |
|---|---|---|---|
| 3,245,043 | 4/1966 | Gaffney, Jr. et al. | 340/172.5 |
| 3,629,831 | 12/1971 | Mikus et al. | 340/152 |
| 3,651,471 | 3/1972 | Haselwood | 364/900 |
| 3,699,532 | 10/1972 | Schaffer | 364/200 |
| 3,704,346 | 11/1972 | Smith | 179/18 BE |
| 3,810,101 | 5/1974 | Avery | 364/200 |
| 3,959,600 | 5/1976 | Sousa | 179/18 BE |
| 4,006,461 | 2/1977 | Coulter | 340/825.26 |
| 4,086,434 | 4/1978 | Bocchi | 179/2 AM |
| 4,090,248 | 5/1978 | Swanson | 364/900 |
| 4,104,486 | 8/1978 | Martin | 179/2 AM |
| 4,149,238 | 4/1979 | James | 364/200 |
| 4,181,941 | 1/1980 | Godsey | 364/200 |
| 4,241,237 | 12/1980 | Paraskevakos | 340/825.26 X |
| 4,332,980 | 6/1982 | Reynolds | 179/2 AM X |
| 4,371,751 | 2/1983 | Hilligoss, Jr. | 179/2 A X |

Primary Examiner—James D. Thomas
Assistant Examiner—David L. Clark
Attorney, Agent, or Firm—Donald M. Sell; James A. Smith; William B. Barte

[57] ABSTRACT

A system is disclosed enabling bidirectional communications between a central station and a plurality of satellite stations over a switched data transmission network in which each satellite station initiates all communications between that satellite station and the central station such that priority data generated within a given satellite station is immediately transmitted to the central station, while routine data generated within each satellite station is stored for delayed transmission to the central station at different times previously set by the central station but monitored by local clocks within each of the satellite stations.

6 Claims, 15 Drawing Figures

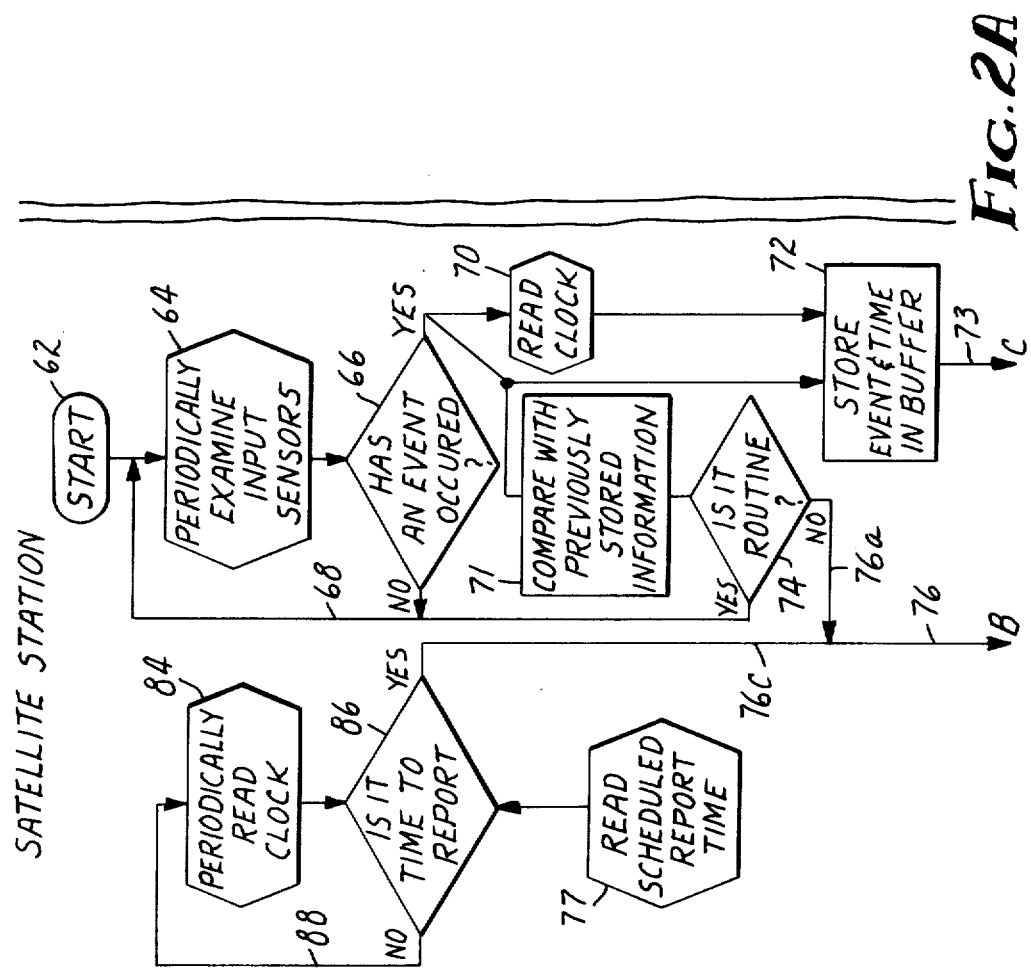

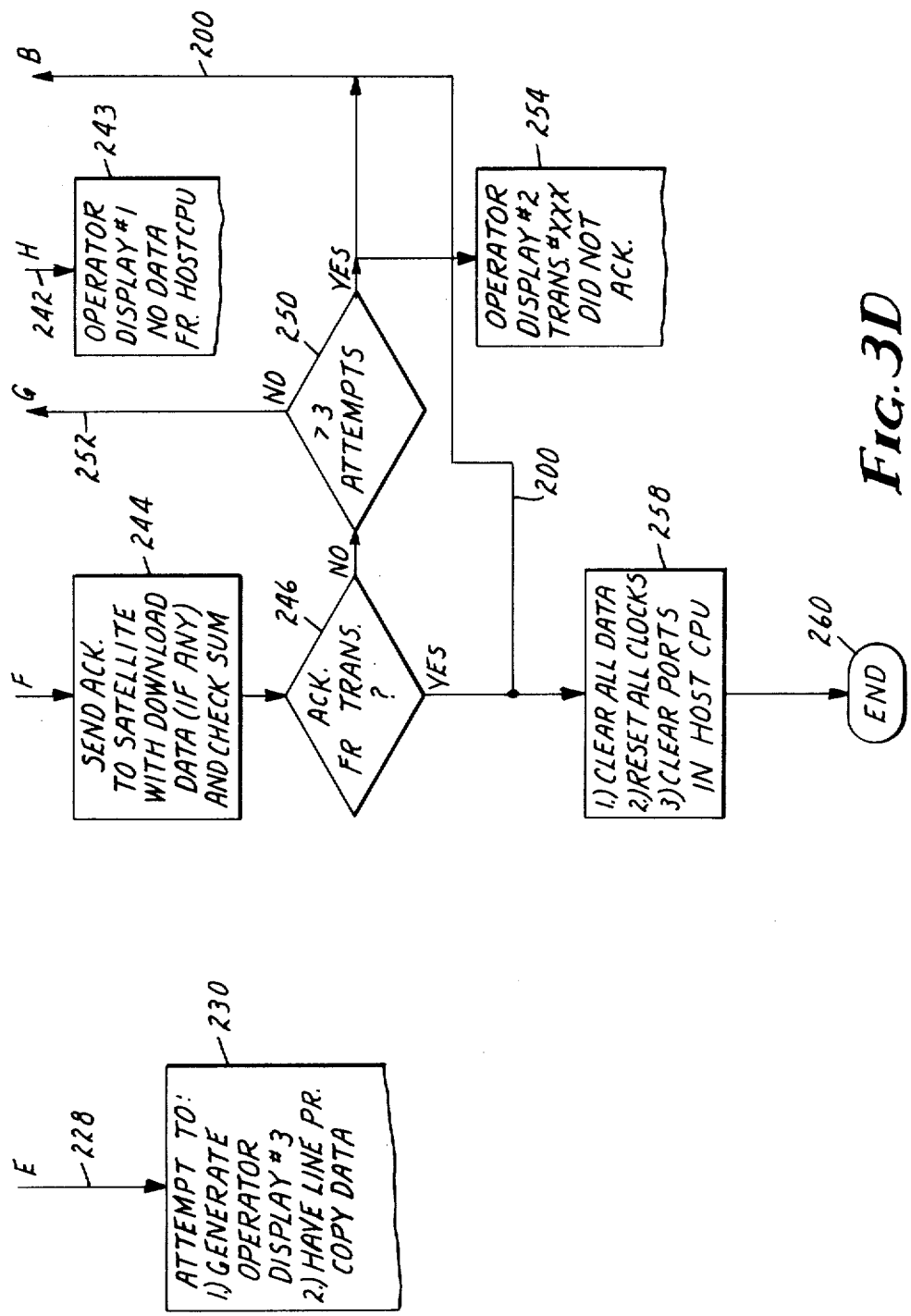

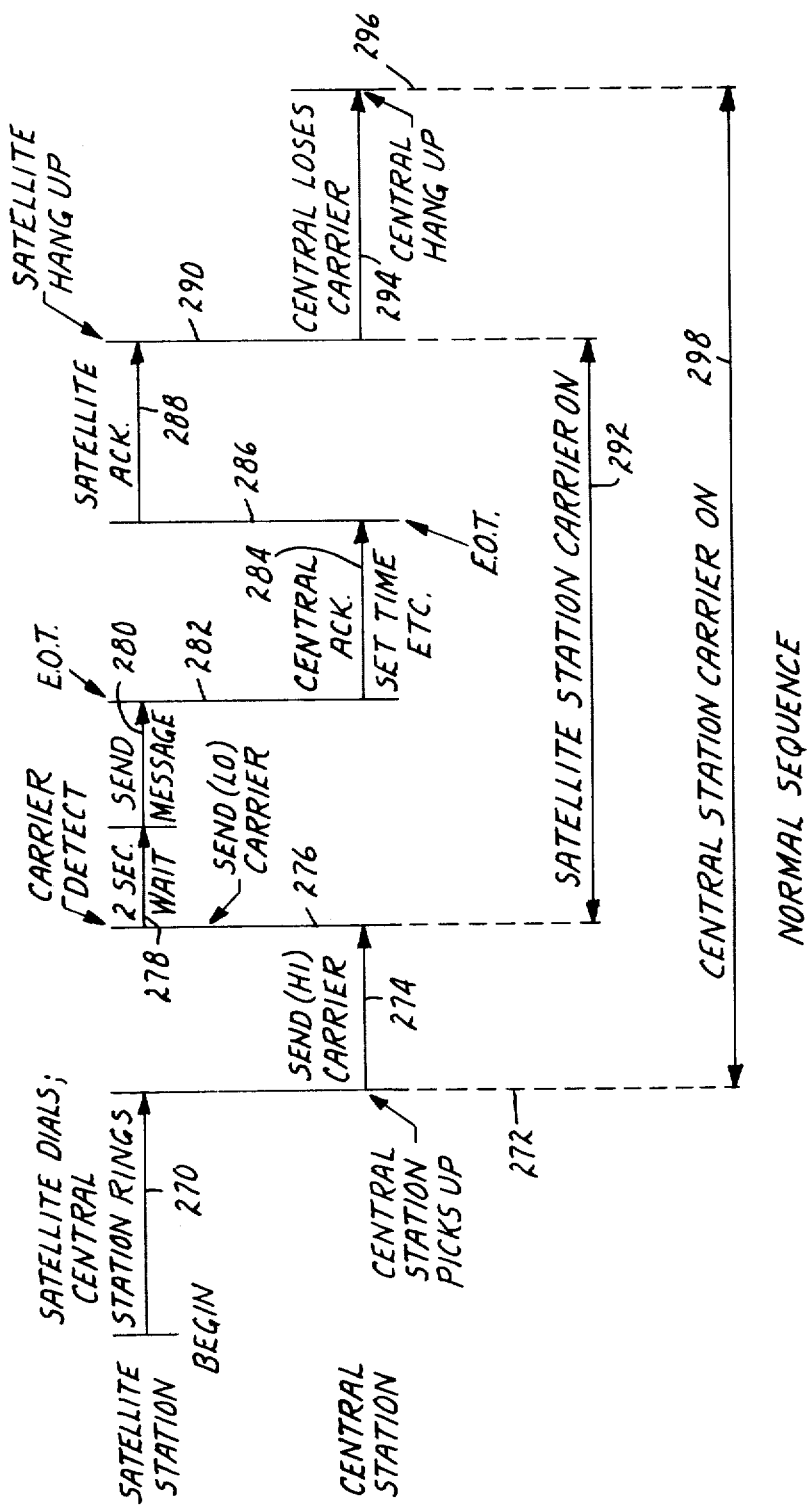

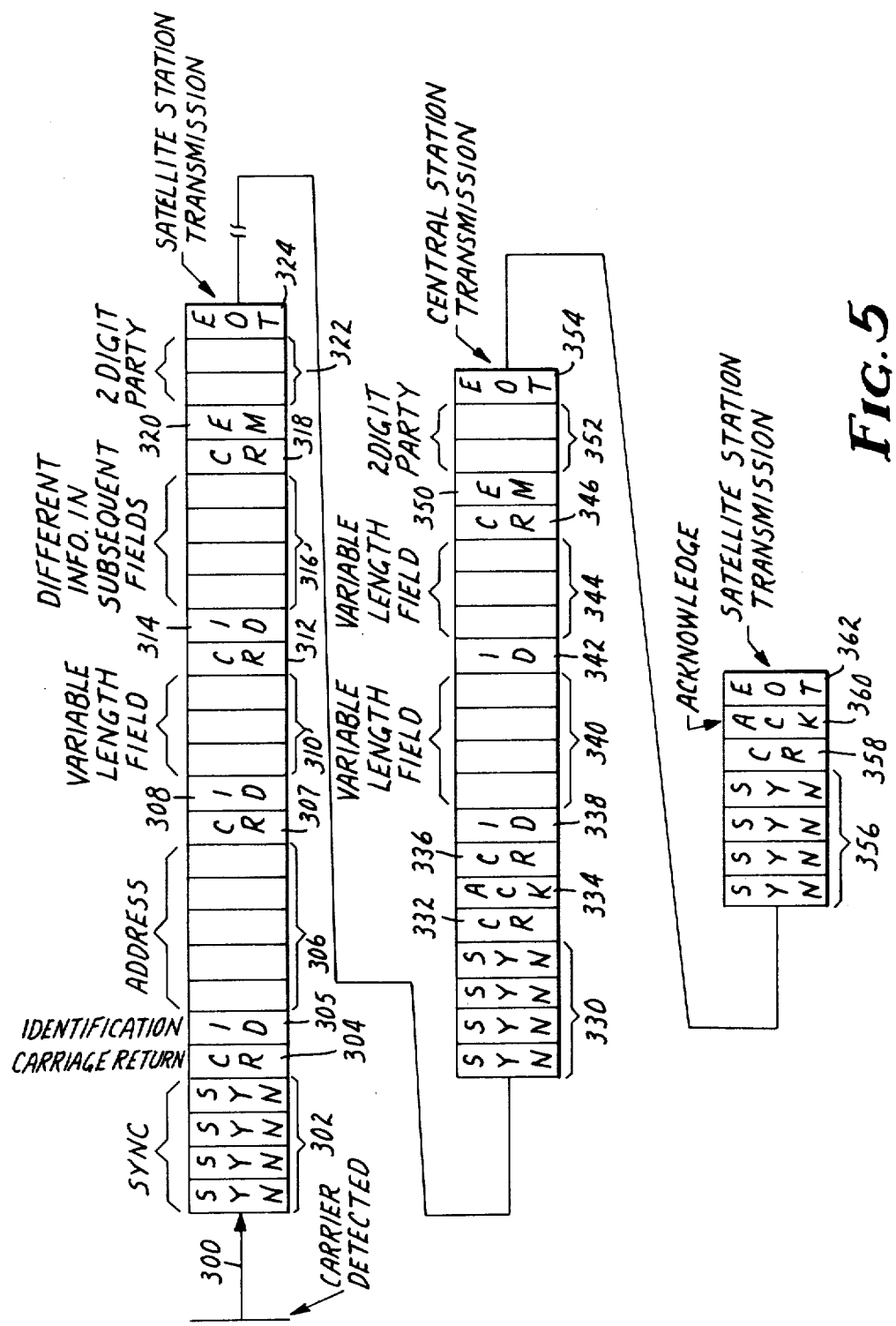

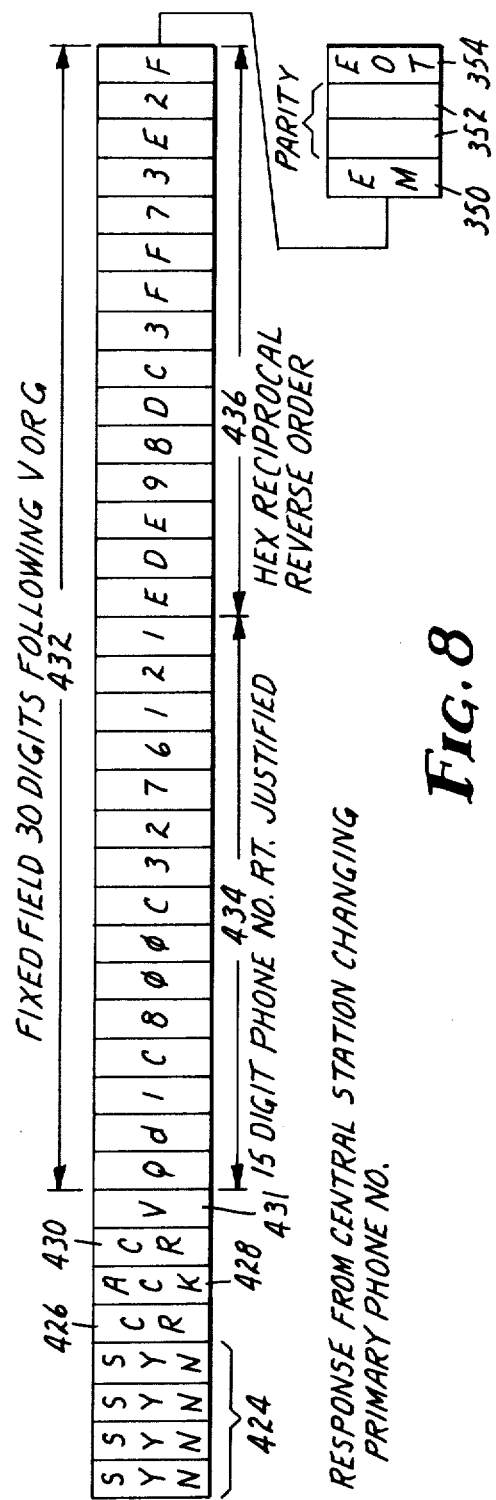

4,447,872

ALARM DATA CONCENTRATION AND GATHERING SYSTEM

BACKGROUND OF THE INVENTION

1. Technical Field

This invention relates to communications systems, in particular to those enabling automatic communications between a central station and a plurality of satellite stations.

2. Background Art

Data communications systems enabling connections to be automatically established, such as through commercial telephone systems, between a central data processing station and a plurality of satellite stations are well known. Such systems are totally oriented to central station control, wherein the central station controls the time at which a given satellite station communicates with the central station, controls the initiation and termination of all such communications, and controls the nature of such communications once established.

For example, U.S. Pat. No. 3,245,043 (Gaffney and Kusnick) is directed to a message communication system in which a plurality of widely spaced apart satellite stations are connected to a central data processing unit. In such a system, each satellite station includes means for storing information which is subsequently transmitted to the central station for processing. In that system, all satellite stations are serially connected, such that data from the most remote station flows through all closer satellite stations prior to being received by the central station. Each station is provided with a gate which senses the absence of signals from other satellite stations directed toward the central station, and thereupon pre-empts the transmission line in order to transmit signals stored within its own information store.

In U.S. Pat. No. 3,629,831 (Mikus and Harvey), an apparatus for controlling data transmissions between a central station and a plurality of satellite stations in which a data conversion unit is provided within the central station to enable data to be transmitted to and received from the satellite stations in serially encoded digital form, whereas it is communicated to a central data processor in parallel encoded digital form. In this system, a satellite station may request communication with the central station, whereupon a selecting means within the central station randomly detects that a given station is in condition to transmit data and thereupon controls the transmission and receipt of information transmitted from that satellite. In both of the systems noted above, a given satellite that is already connected to the central station precludes connection of other satellite stations to the central station such that all communications from other satellites, both of routine and priority type information, would be thwarted.

Other communications systems are also known which operate on a pure interrupt basis, that is, the occurrance of an alarm signal from a sensor associated with a satellite station immediately causes that satellite to activate automatic dialing equipment, thus securing an available transmission line for immediate transmission of that alarm signal to a central station.

DISCLOSURE OF INVENTION

In contrast to such data communication systems as discussed above, the system of the present invention includes features whereby desirable aspects of systems in which satellite stations are individually polled for subsequent bidirectional communications with the central station are provided together with certain aspects of systems wherein satellite stations are enabled to communicate with the central station solely on a priority interrupt. The present system thus includes a plurality of satellite stations and a central station, bidirectional communications between which are enabled via a switched data transmission network such as a conventional telephone network, and enables routine data to be received and held within each of the satellite stations, and to be subsequently transmitted to the central station at different predetermined times upon the initiation of communications therewith under local control of each satellite station.

The central station of the present system thus includes a master clock which controls the timing of the overall system, and which maintains ongoing time settings, while each satellite station includes a local clock which is responsive to instructions from the master clock and which controls the initiation of routine communications from that satellite station to the central station at predetermined times.

Further, the central station includes a memory bank within which data signals associated with each satellite station are stored at locations having designated addresses associated therewith. The central station also includes means for receiving data signals from the satellite stations and for transmitting data signals to the satellite stations.

To enable the central station to process data signals received from a given satellite station at predetermined times under direct control of the local clock within each satellite station, the central station also includes means for initiating access to a given address within the memory bank in response to receipt of a communication originating within a given satellite station, together with means for routing the data signals received as a part of the originating communication to the designated address within the memory bank which is associated with that satellite station.

Each satellite station is kept current as to the ongoing time and the time for the next required communications by further providing the central station with means for accessing the master clock to provide instructions indicative of the real-time setting of the master clock and of the time setting for the next required satellite communication, which time setting is different for each satellite station and with means for coupling those instructions to the transmitting means for transmission to the satellite station then in communication with the central station. The central station is also provided with means for terminating a given communication.

As noted above, each satellite station includes a local clock which is responsive to the instructions from the master clock and which thus controls the initiation of communications and the transmission of routine data signals to the central station at the predetermined time for that satellite station. Each satellite station also includes means for synchronizing and adjusting its local clock in response to instructions from the master clock, store and forward means for accumulating routine data for transmission to the central station at the predetermined time for that station, means responsive to its local clock for initiating communications with the central station, and means for inputting routine data into the store and forward means.

In a preferred embodiment, each of the satellite stations further includes means for inputting non-routine data into the store and forward means and means for initiating said communications with the central station at any time on a priority interrupt basis for enabling immediate transmission of the non-routine data.

BRIEF DESCRIPTION OF THE DRAWINGS

FIGS. 2a-2e are a flow diagram indicating the manner in which signals are processed within the central station and a given satellite station;

FIGS. 3a-3d are a flow diagram indicating a preferred embodiment for processing signals within the central station;

FIG. 4 is a signal timing diagram indicating the normal sequence of signals transmitted between the central station and a satellite station;

FIG. 5 is a diagram of a preferred format for signals generated within the central station and a satellite station;

FIG. 7 is a diagram of a typical time-update response format generated within the central station; and FIG. 8 is a diagram of a typical phone number change response for signals generated within the central station.

DETAILED DESCRIPTION

Figure 1:
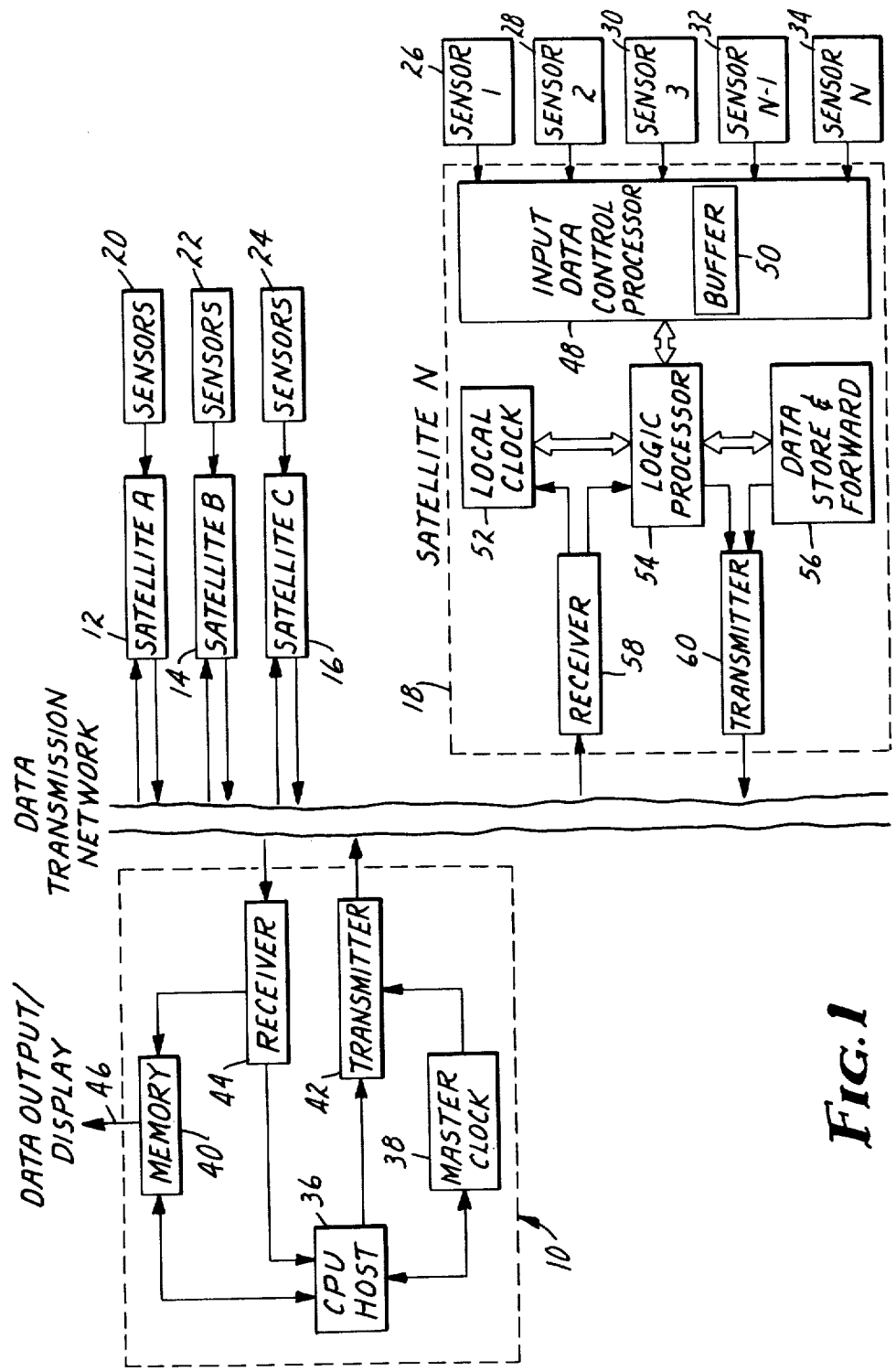
FIG. 1 is a simplified block diagram of the system of the present invention showing the primary components of the central station together with a plurality of satellite stations, one of which is expanded to show the primary components therein.

Referring now to FIG. 1, it may be seen that the system of the present invention includes a central station 10 and a plurality of satellite stations 12, 14, 16, and 18. As is there shown, each of the satellite stations is coupled to the central station 10 via a data transmission network, which network is preferably a conventional automatically dialed telephone system. As such systems are conventional and do not encompass the present invention directly, no further details thereof are provided herein. Each of the satellite stations 12 through 18 is further provided with a plurality of sensors, those associated with satellites 12 through 16 being identified as components 20, 22 and 24, respectively. Sensors 26, 28, 30, 32 and 34 are associated with satellite station 18, which is shown in expanded form in FIG. 1, and are further identified as sensors 1 through N, thus indicating that any given satellite may be served by as many sensors as is desired for a given application. The typical sensors utilized with the satellite stations of the present invention will thus preferably include perimeter, window and door switches suitably installed so as to indicate the condition of a given entry way, intrusion detectors, fire and smoke alarms, and the like.

The basic construction of the central station 10 is further shown in FIG. 1 to include a host Central Processing Unit (CPU) 36, a master clock unit 38, a central memory 40, a transmitter unit 42, and a receiver unit 44. The Central Processing Unit 36 thus functions as an overall controller in that it processes information received via receiver 44 and routes information therefrom to the memory 40, from whence it may be outputted on lead 46 to suitable display devices (not shown). Similarly the host CPU 36 controls the master clock 38 such as to implement outputting of appropriate signals from the transmitter 42 to a given satellite station via the transmission network.

In like fashion, each of the satellites A through N, such as shown in enlarged form for satellite N, shown as component 18, comprises the components shown in the block diagram of FIG. 1. Thus each satellite station may be seen to include an input data control processor 48, a buffer memory 50, a local clock 52, a logic processor unit 54, a data store-and-forward unit 56, a receiver 58, and a transmitter 60. As is schematically shown in FIG. 1, the input data control processor 48 thus functions to receive input signals from all of the respective sensors coupled to a given satellite station and to output signals having a common format representing the signals from the respective sensors to the logic processor unit 54. The processor unit 54 functions much as the host CPU 36 in the central station in that it further controls the processing of the signals within the satellite station, either routing signals from the control processor 48 into the data store-and-forward unit 56 for temporary storage, or for controlling the subsequent transmission of such stored information via the transmitter 60 through the data transmission network, and thence to the central station 10. The logic processor 54 also controls the flow of signals to and from the local clock 52 to thereby synchronize the various signal processing operations within the satellite station, as well as to enable updating and resynchronization of the local clock with the master clock 38 within the central station, as instructed by signals received from the central station 10 via the receiver 58.

While the respective components of the central station 10 and each of the satellite stations 12 through 18 are thus shown in the block diagram of FIG. 1, the functions performed by each of the respective stations is preferably described via the combined flow diagram shown in FIGS. 2a through 2e. In the present system, while control over the operations within each of the satellite stations A-N is under the control of the central station 10, and more particularly, under the control of the host CPU 36 within the central station, each of the satellite stations is provided with the capability of independently controlling its own operation. Each satellite station thus has the sole capability of initiating communications with the central station, albeit at predetermined times earlier dictated by the central station. This feature is immediately apparent in FIG. 2a, where it is indicated that the beginning, or "start", 62 of all communications is initiated within the satellite station. At periodic, and closely spaced intervals, as controlled by the local clock 52, the state or condition of each of the sensors coupled to the given satellite is examined as shown in block 64. If such an examination indicates that the given sensor is in a state indicative of the absence of the occurrence of an event, such as a window or door switch being in an open condition, or the like, a "commutate sensors" signal is provided (block 66) on lead 68, which then causes the subsequent examination of a second sensor. On the other hand, if the examination indicates that an event has occurred, the time at which the occurrence of the event has been registered is determined by reading the local clock as shown in block 70 and information representative of the identity of the event and the time of occurrence thereof is stored in the buffer memory 50, as shown in block 72. Concurrently, the nature of the event is compared against information previously stored in the control processor 48 as shown in block 71. If it is thus determined as shown in block 74, that the event is routine, a commutate sensors signal is similarly provided on lead 68 as noted hereinabove, such that the state of a subsequent sensor is next interrogated. On the other hand, if it is determined that the occurrence is not routine, thus indicative of an emergency or a priority message, the non-routine emergency signal is provided on lead 76a. Basically, once information representative of an event and time of occurrence thereof has been stored in the buffer 50, the information remains therein until instructions are received to read the information from the buffer as shown in block 78. However, due to finite capacities of buffer memories, in a preferred embodiment, periodic inspection of the contents of the buffer memory 50 is desirable. Thus, if the inspection indicates that the buffer is not filled to capacity, as shown in block 82, further inputting of information into the buffer is enabled. Alternatively, if the inspection indicates that the buffer is full to capacity, an additional output signal on lead 76b is provided.

The manner by which each satellite station controls the initiation of routine communications to the central station is further evident from the instruction blocks 77, 84 and 86, which indicate that the local clock 52 is periodically read (block 84) and compared against a pre-established time setting held in memory (block 79) to determine whether the time previously set within the memory (block 79) upon instructions from the central station has transpired. If it is not yet time to report, a signal is provided on lead 88 that causes the local satellite clock 52 to be read again on the next periodic cycle. Alternatively, if it is then determined that it is time for the satellite station to report to the central station, a further output signal is provided on lead 76c.

As noted above, it may thus be seen that a transmission initiate signal will be provided on lead 76 under at least the three sets of conditions previously discussed, namely that a non-routine event has occurred (76a), that the buffer memory 50 is full (76b), or that the time for a periodic report has occurred (76c). Further, as noted hereinbelow, in the event that data transmitted to the central station has been found not to be properly received at the central station, a further transmission initiate signal will be provided on leads 76d and 76e. The occurrence of such an initiate signal on lead 76 thus initiates the dial sequence shown in block 90. This causes an automatic dialing apparatus, which as noted hereinabove, is not an integral part of the present invention, to activate a dialing signal which is transmitted through the transmission network as indicated in FIG. 1, which dialing signal is thereupon detected within the central station as shown in operation block 92.

When the dialing signal is thus detected, a pickup instruction is initiated as shown in block 94, and an acknowledgment of the appropriate receipt of the ringing signal is transmitted as shown in block 96 on lead 98. Upon receipt of the acknowledgment signal as indicated in block 100, assuming that acknowledgment is indicated, the satellite station then proceeds to transmit to the central station its own address as shown in block 102 on lead 104, thereby identifying itself, and upon completion of the transmission of the address, reads the buffer as shown in block 78 and transmits stored information on lead 104 as instructed by block 105. Conversely, if the acknowledgment is not indicated within a predetermined time "T−1" as monitored by block 108, the satellite station "hangs up" as indicated in block 110, and reinitiates the dialing sequence as indicated on lead 76d and block 90.

At the same time that the acknowledgment signal is transmitted to the satellite station on lead 98, in a preferred embodiment, a timer within the central station 10 and having a preset running duration, for example 10 seconds, is activated (112). Upon expiration of that time period, as shown in 114, the central station automatically and unequivocally "hangs up" as indicated in block 116. Alternatively, if the timed period has not lapsed, the processing continues, as indicated in block 118, and data stored within the buffer 50 of the satellite station is then transmitted on lead 120 to the central station. This optional feature thus acts as an ultimate fail-safe provision. Should all other message terminating provisions of the system fail, it ensures that the central station will "hang-up", thereby severing the communications link and freeing the line to receive other transmissions after a time long in excess of that required to transmit even the longest routine or priority message.

Upon receipt of stored data in the buffer as indicated within block 122, the central station processing unit 36 first receives the address of the satellite transmitting the data as indicated in block 124, which information is transmitted on lead 126 and stored within the memory unit 40 of the central station (block 127). The central station next receives the actual transmitted data as indicated in block 128 and upon confirmation that all of the data has been properly received, as indicated in block 130, transmits that data to the central station memory 40 as indicated in block 132 where it is stored (bolck 133). In the event that the data is not appropriately received, a data not-acknowledged signal is transmitted, as indicated at block 134, via line 139 to the satellite station. Alternatively, if the data is appropriately received and sent to the memory as indicated in block 132, a data acknowledged signal is transmitted on line 139 as indicated at block 136. If the data acknowledged signal is received by the satellite station, it goes into a "wait" mode, as indicated by blocks 138 and 140. Alternatively, if the data not-acknowledged signal is received, a repeat signal is provided on lead 141 which initiates a retransmission of the satellite's address, as indicated in block 102, and of the data stored in the buffer, as indicated in block 105 on lead 120.

Upon storage (block 133) of the data within the memory 40, the memory 40 is read (block 143) and confirmation of proper receipt and storage of the data within the memory 40 is then indicated by block 142. In the event that check indicates that the data was not properly recorded, a signal is provided to cause the data to be retransmitted to the memory as indicated in block 132. Alternatively, if the memory properly received and stored the data, the master clock 38 is then interrogated to obtain a signal representing the ongoing time and the time at which the satellite station, then in communications with the central station, is required to next report, as indicated in block 144. This information is then transmitted to the satellite station as indicated in block 146. Within the satellite station, the confirmation of the appropriate receipt of the time information is then determined, as indicated in block 148. In the event the time data was incorrectly received, a time data not-acknowledged signal is sent, as indicated in block 150, while if the data is properly received, a data-acknowledged signal is transmitted, as indicated in block 152. Upon receipt of one or the other signals within the central station, as indicated in block 154, if the data was improperly received, a signal is provided on lead 156, causing the time data to be retransmitted, as indicated in block 146. Alternatively, if the time data was appropriately received, the central station then "hangs-up" as indicated in block 158, thus terminating the entire message sequence.

Similarly if the time data was properly received within the satellite station, the satellite station also "hangs up" as shown in block 160. On the other hand, if the time data was not appropriately received, a data not-acknowledged signal is sent as indicated in block 150, and if no signal is received in the satellite station prior to expiration of time T−2, as indicated by block 162, the satellite station is made to "hang-up" unconditionally (via line 161). This precaution prevents unauthorized equipment from keeping the satellite station "off-hook" for a protracted period of time. This same signal issued by block 162 causing the unconditional "hang-up" also reinitiates the dialing sequence via lead 76e. If, as determined in block 148, the master clock time and the next scheduled report time are correctly received, not only is the satellite station caused to "hang-up" as mentioned previously, but a signal is provided which resets the satellite station local clock (block 64) and stores the newly scheduled next report time. These events terminate the transmission from the satellite station.

Once the system described in FIGS. 2a through 2e is understood, it can easily be seen that a much simplified embodiment could be used in such applications as reading utility meters and reporting said readings to a central station periodically. In such an embodiment, it is only necessary for the local clock to be compared against the next scheduled report time. There are no unscheduled events. When the time has come for the satellite to report, it simply reads the value indicated by the meter, stores it, and initiates communication with the central station. All the error checking protocols would continue to be observed and the local satellite clock and next scheduled report time would again be synchronized to that of the host CPU.

It may thus be seen that the flow of these respective signals as indicated in the flow diagram described above in conjunction with FIGS. 2a through 2e, enables each of the satellite stations to communicate on a quasi-independent basis with the central station, such that all communications between any given satellite station and the central station are initiated by that satellite station, priority data from such satellite stations being transmitted to the central station without delay while routine data is transmitted from the satellite station at the prescribed times as instructed by the central station.

Figure 2B:
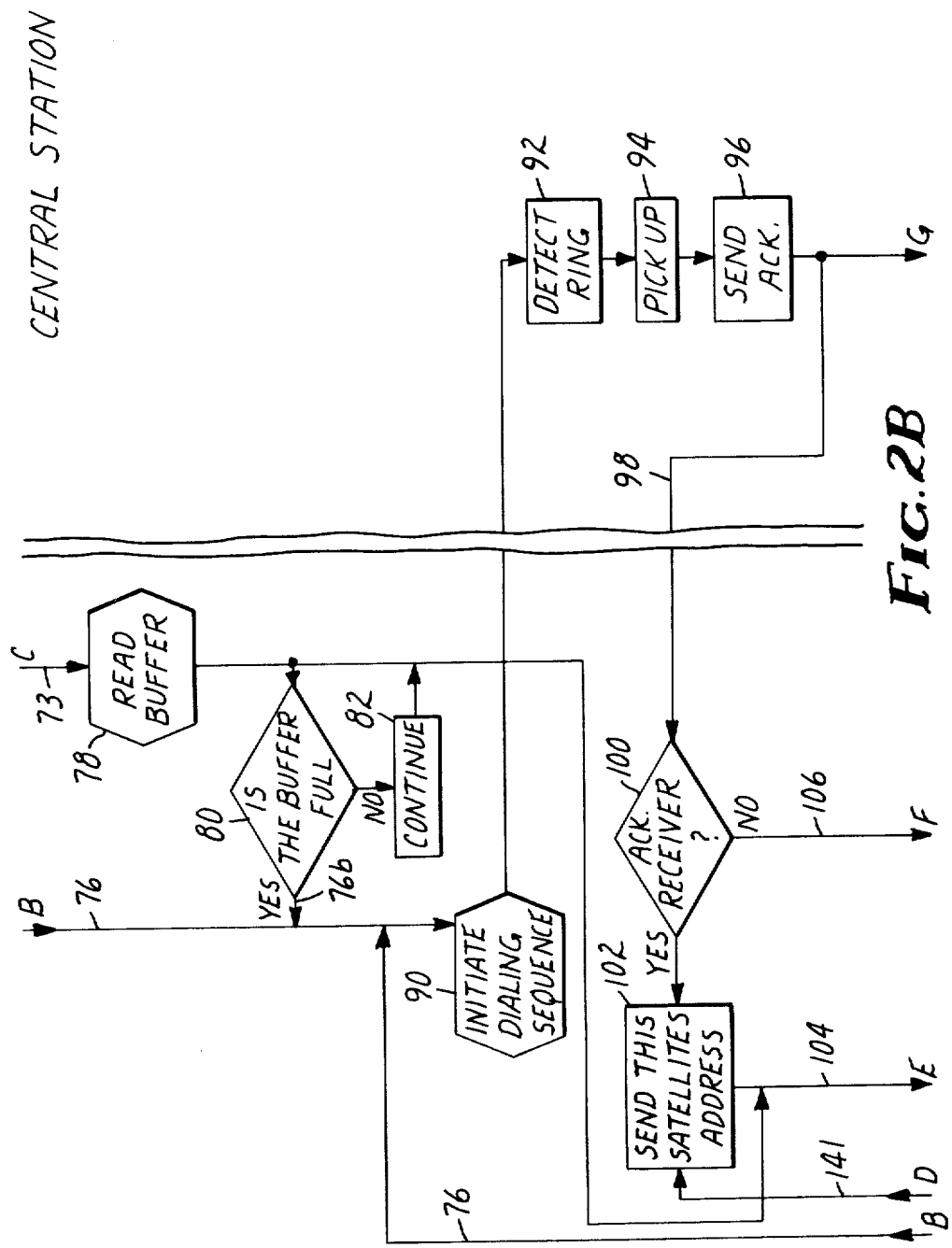

FIGS. 3a through 3d set forth in more detailed form a preferred flow diagram indicating the manner within which signals are preferably processed within the central station 10 of FIG. 1. Accordingly, in FIG. 3a it may be seen that the central station will pick up the line as indicated in block 94 either upon the detection of a ringing voltage, block 92, (both of which blocks are also indicated in FIG. 2b) and also upon receipt of a command from the central station operator as indicated in block 170, or upon indication of an automatic busy signal as indicated in block 172. The signal produced by a central station operator as indicated in block 170 thus enables testing of line conditions by a central operator to insure the operability of the incoming line from the satellite stations and to insure that the system is in appropriate condition to receive communications initiated by any one of the satellite stations. The "automatic busy" signal indicated in block 172 is generated as a result of several diagnostic self tests which include interrogation for proper power supply voltages, proper operating conditions of the phone line, whether the printed circuit cards are plugged into their addressed slots, etc. In a preferred embodiment, upon detection of a defective condition thereof, the central station "picks up" the line, for example, causing a WATS-rotored network to switch to a next higher incoming line, thereby ensuring that the central station is always in condition to receive a communication initiated from any one of the satellite stations.

Figure 2C:
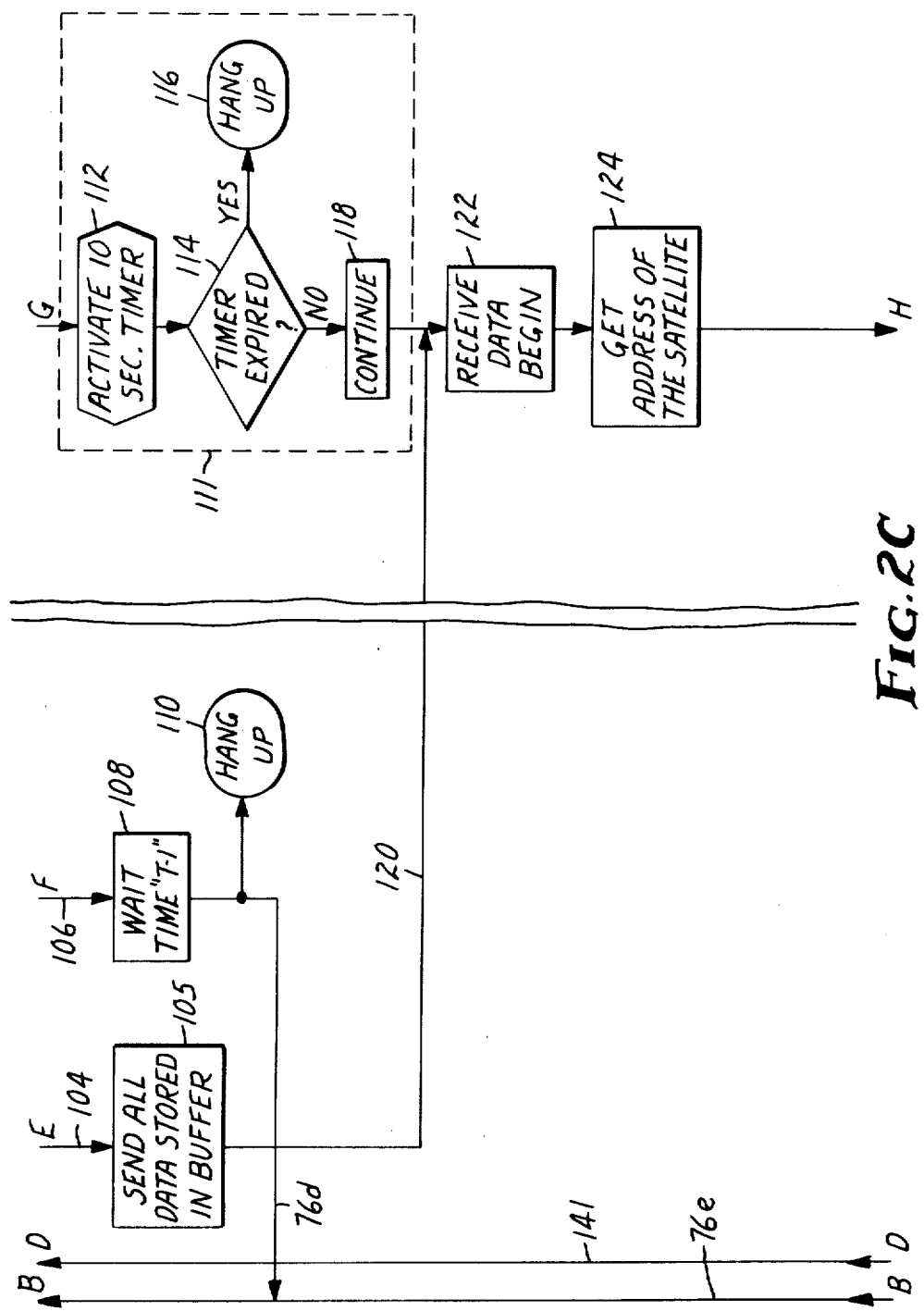
Figure 2D:
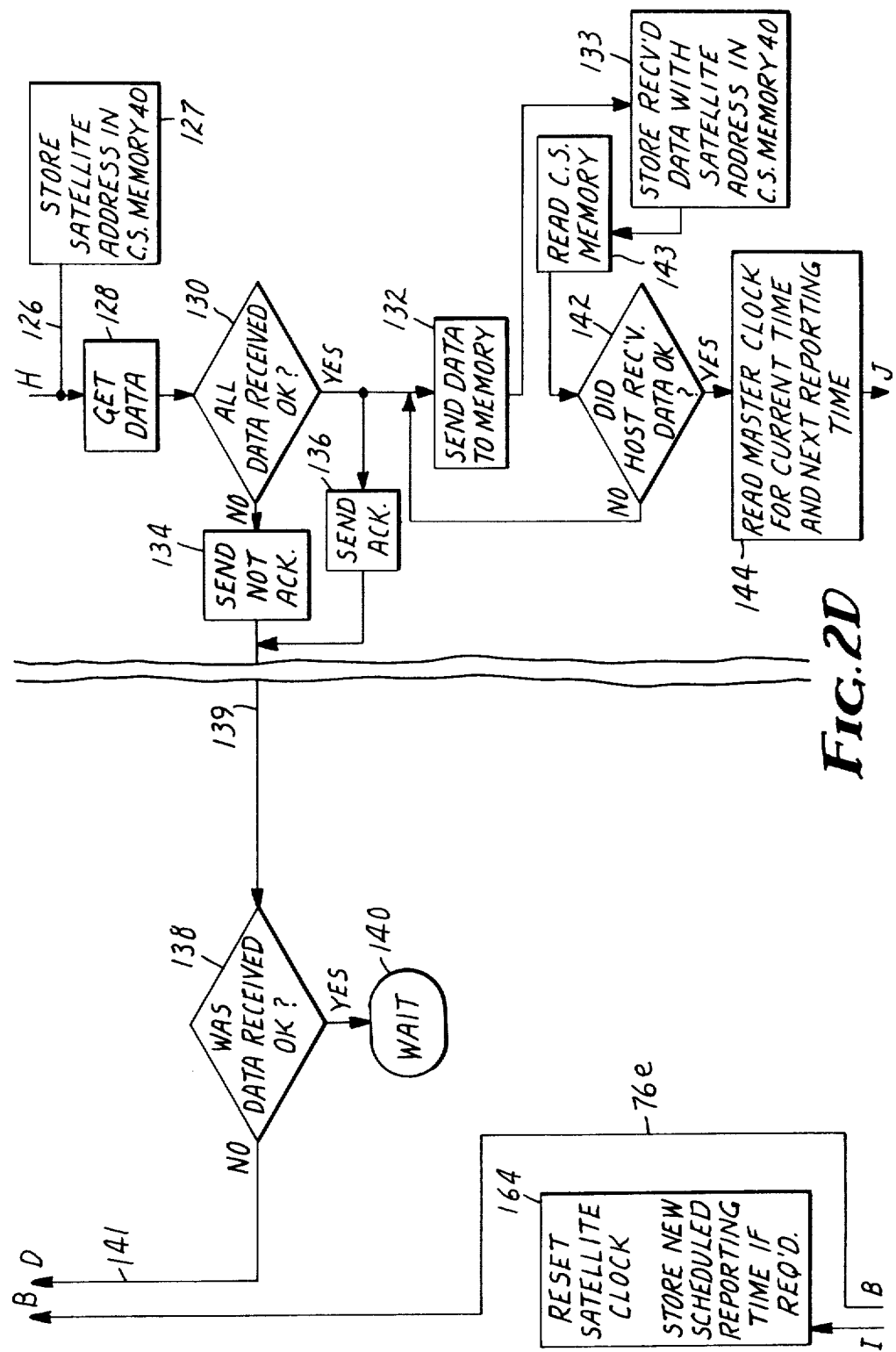
Figure 2E:
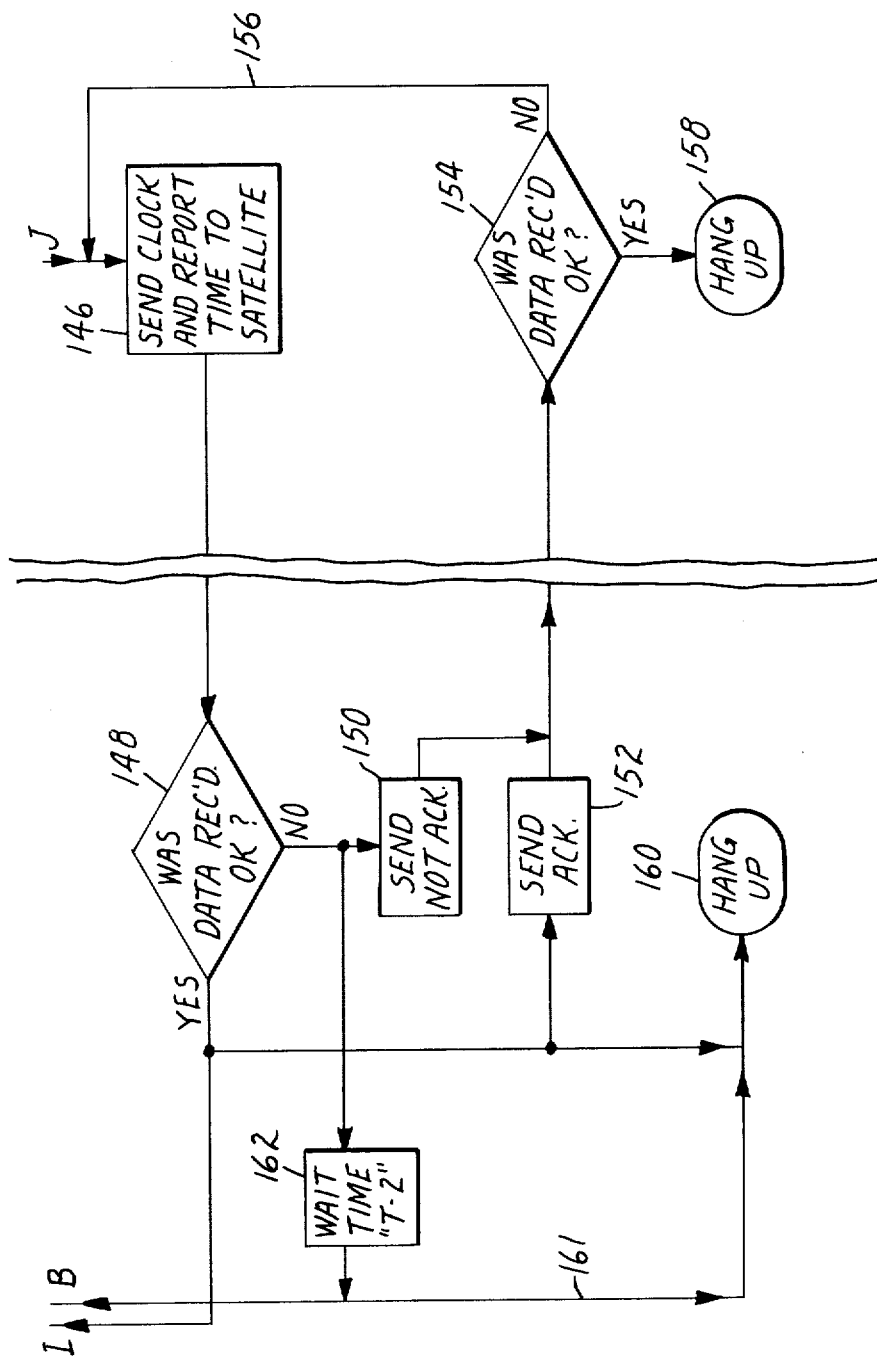

A signal from any of the sources 92, 170 or 172 is thus coupled through OR logic 174 to the pick-up line 94, causing the immediate transmission of the higher of two frequency carrier tones (such as a 2 kilohertz tone) to the satellite station, as indicated in block 176. Simultaneously, the timer operations 111, indicated as optional in FIG. 2c, are initiated. As shown in more detail in FIG. 3a, these operations include a 10 second clock 178, a 1 second clock 180, and a 3 second clock 182. Upon transmission of the high carrier signal, the 10 second clock begins its countdown as shown in block 178. In contrast to the 10 second period thus initiated, typical data transmissions take between 2 to 4 seconds, there being required approximately a 2-second initial delay period to allow the transmission lines to settle into a quiescent state, and between 2 milliseconds to 2 seconds of actual data transmission time. Accordingly, as indicated in block 184, upon expiration of the 10 second clock period as indicated on lead 186, the system hangs up as instructed in block 188. Alternatively, if the 10 second clock period has not expired, a signal is provided on lead 185, causing the processing of the incoming signals to proceed.

The running of the 1 second clock as indicated in block 180 insures that the satellite station has received the central station carrier tone and has in turn transmitted its own carrier, such as a 1600 hertz signal, which signal has been received by the central station prior to the expiration of the 1 second clock, as indicated in block 190. If the completion of that exchange of carrier signals has not occurred, as indicated at line 192, the system further hangs up as indicated in block 188. Contrariwise, if the carriers have appropriately been received, further processing of signals proceeds as indicated on lead 185. Finally, to insure that the communication lines between a satellite station and the central station are not indefinitely tied up due to some malfunction, the running of the 3 second clock, as indicated in block 182, disconnects any initiated communication within 3 seconds. If data has not been received before the expiration of such a time period, the system further is caused to hang up as indicated in block 194 and line 196. Alternatively, if a modulated carrier containing the data is detected prior to the expiration of that clock period, the processing of data is further enabled to proceed as indicated on lead 185.

The receipt of the appropriate signals from the three clocks as indicated above generates a signal on lead 185 and thus causes the processing of data to continue as indicated in block 118, also shown in FIG. 2c. This in turn causes the receiving of data within the central station to begin as indicated in block 122. In a preferred embodiment, as indicated in block 198, the system is enabled to detect the loss of either of the carrier signals, noted above. Thus, if the incoming 1600 hertz signal is lost, causing a dropout in received data such that the data would be improperly recorded, that indication is provided on lead 200 and is coupled therethrough to the "hang-up bus" causing the system to hang up as indicated in block 188 of FIG. 3a. Such a detection could be effected by a relay which is held in place by the 1600 hertz tone signal. Any cessation of the signal would cause the relay to open, thereby providing the signal on lead 200 as noted. Assuming that the carrier is not lost during the receipt of the data, processing signals continue until all data is received, as noted in box 202. Concomitantly with the receipt of data, the central station finds an open port by which data may be entered into the CPU, receives the reporting satellite address and advises the host CPU that data to be stored in the appropriate location is about to be transmitted, as indicated in box 204.

Preferably, the transmission of data from each satellite station includes the transmission of a unique end-of-message signal at the end of each communication. Such an end-of-message signal corresponds to a parity check which may be monitored as indicated in box 206 to insure the correct receipt of the data. Assuming such data has been received correctly, instructions are then provided to enable the input of the data to the appropriate port of the host CPU, which has already been opened for such receipt, as indicated in boxes 208 and 210. Alternatively, if parity does not check, the satellite station is instructed to again transmit the data and the central station again begins to receive the data as indicated in box 122. Such attempts to receive data will then proceed three times as indicated in block 212. After three such attempts if parity still does not appropriately add, the system is caused to hang up as indicated on the "yes" output of box 212 to the "hang-up" bus on tie line 200.

Figure 3A:
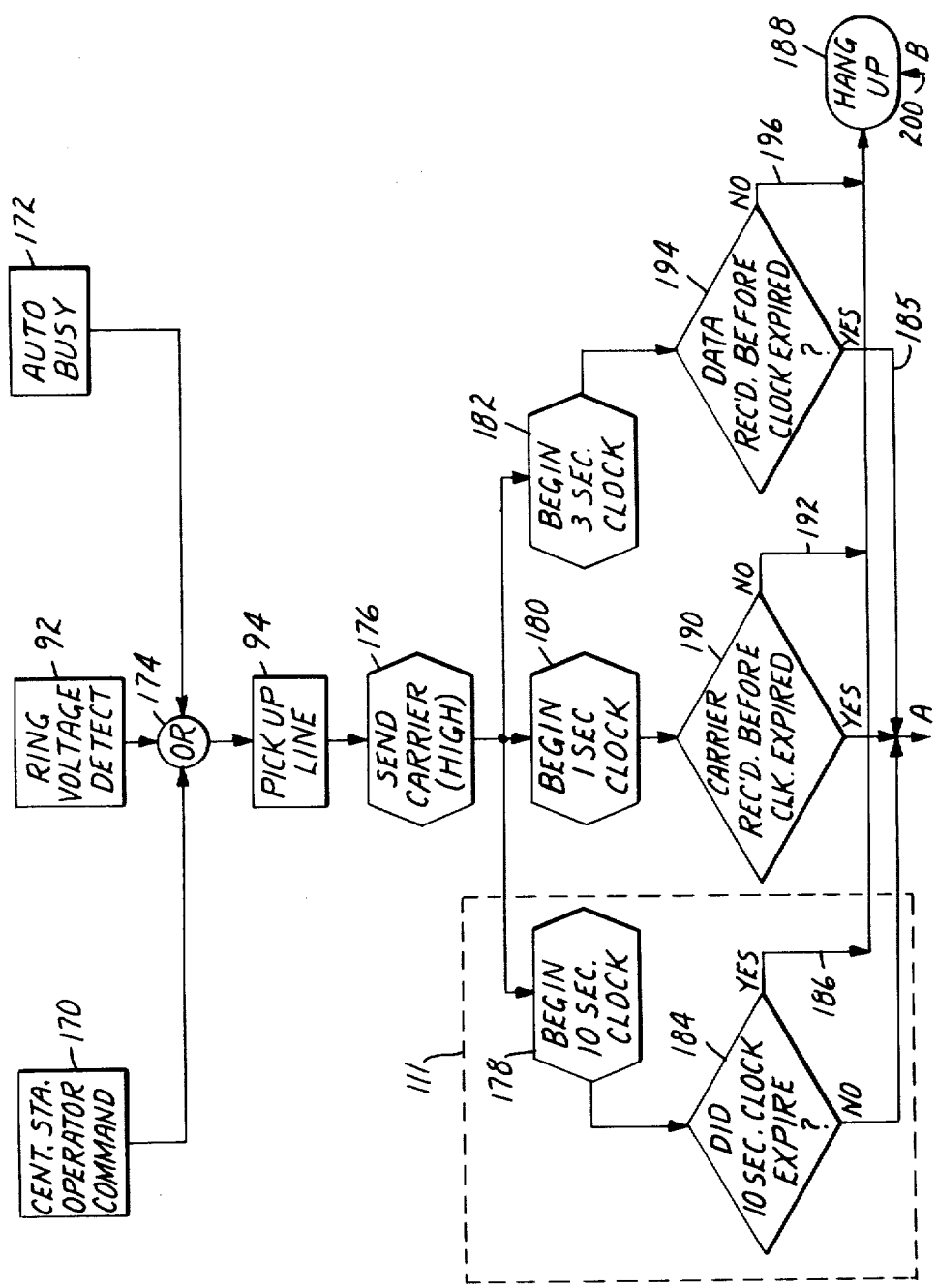
Figure 3B:
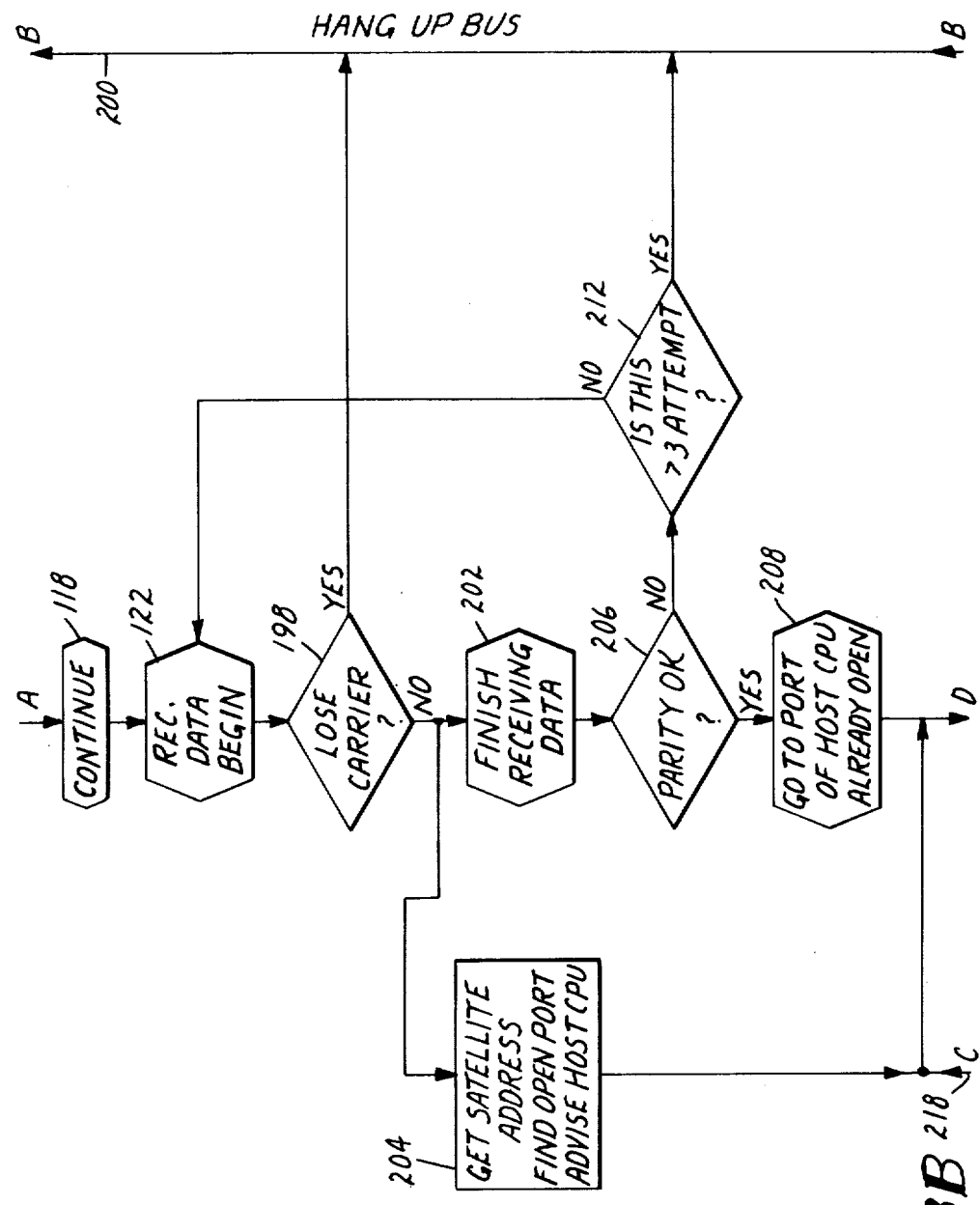
Figure 3C:
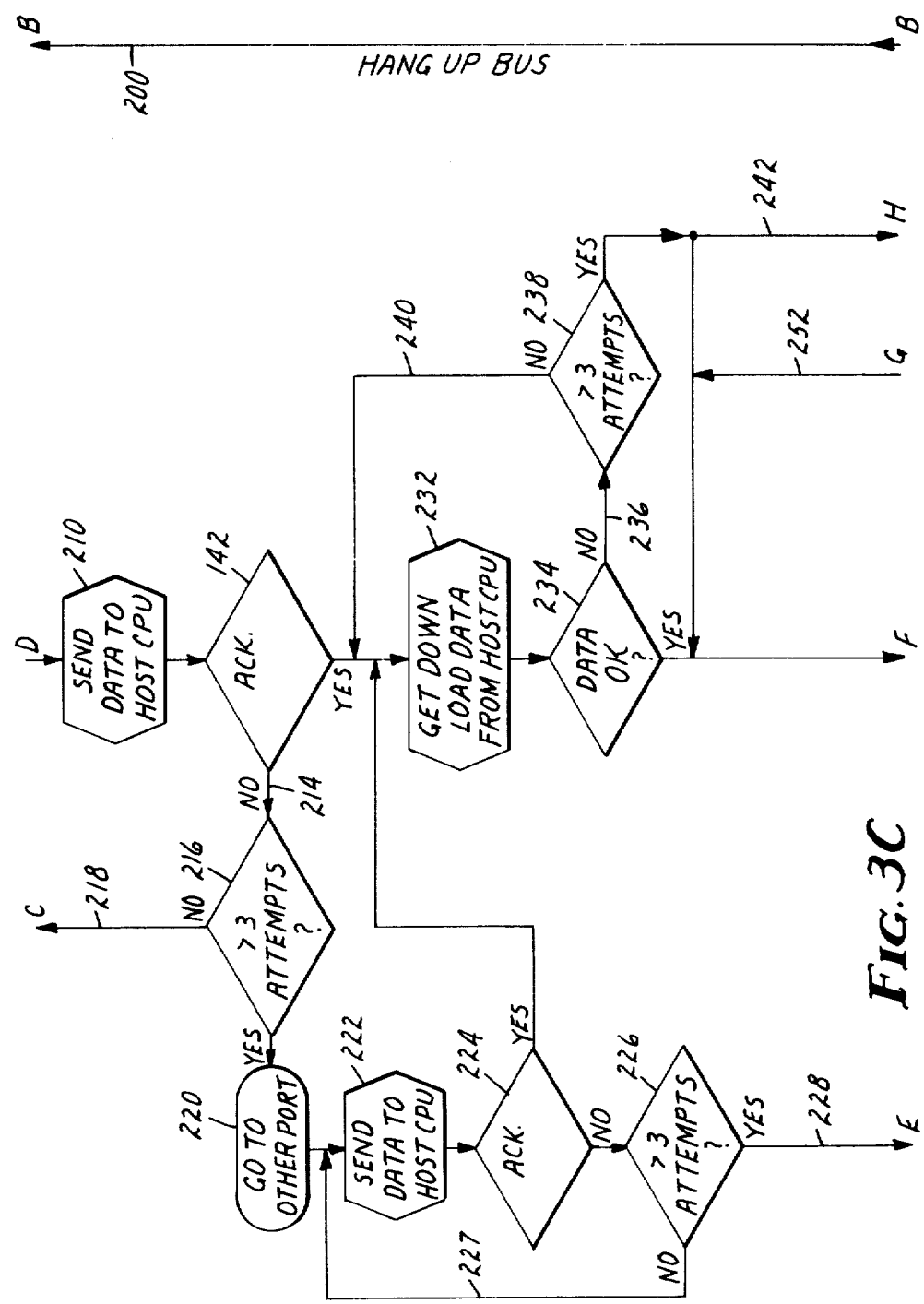

Referring now to FIG. 3c, upon completion of the receipt of the information within the host CPU, an acknowledgment signal is received from the CPU as indicated in block 142. In the event the correct receipt of the data within the host CPU is not acknowledged, reentry of the information into the host CPU is then attempted as indicated in tie line 214, box 216, and tie line 218 in a manner analogous to that set forth in box 212 above. If such attempts to enter data fail after the third attempt, the receiver of the central station is then instructed to open a different input port to the host CPU, and the data is inputted into that port, as indicated in boxes 220 and 222. Upon receipt of a not-acknowledged signal as indicated in block 224, the entry of the data into the alternative port will be attempted three times as indicated in block 226, thus causing the data to be reentered into the alternative port as indicated in line 227 and block 222. If after three such attempts the entry of such data is still not verified, a signal is provided on lead 228, thus causing the CPU to attempt to generate an operator display and to have an auxilliary line printer copy the input data as indicated in block 230 of FIG. 3d.

Upon receipt of the appropriate acknowledgment signal from either block 142 or 224, thus indicating that the input data has been properly entered into the host CPU, data stored within the host CPU corresponding to the ongoing real time, the next required reporting time for the satellite and further instructions relating to that satellite's operations (identified in block 232 as "down load data") are then outputted from the host CPU. Such data is then verified as indicated in block 234, and if incorrect, reentry of the data from the CPU is attempted three times as indicated in tie lines 236, block 238 and line 240. If after three such attempts, the receipt of correct data is still not indicated, a signal is provided on lead 242 which causes an auxilliary display monitor 243 to indicate that no data had been received from the host CPU.

Assuming, however, that the data was indicated as being received correctly, as indicated in block 234, an acknowledgment signal "down load" data, if any, and an end-of-message check sum, is then transmitted to the satellite station as indicated in block 244. The receipt of such information within the satellite station then causes the transmission to the central station of an acknowledgment as indicated in block 246. If the acknowledgment indicates incorrect receipt of the information, the transmission of the data to the satellite station is then reattempted as indicated in tie line 248, block 250, and tie line 252. If the acknowledgment is still not received after three attempts to transmit the data, the auxilliary display indicates that the appropriate acknowledgment was not received, as indicated in block 254. Concomitantly, a signal is further provided on the "hang-up" bus. Finally, however, assuming that appropriate acknowledgment was received, the central station is then caused to hang up, to clear all data, to reset all clocks, and to clear the input ports within the host CPU, as indicated in block 258, thus ending the processing as indicated in block 260.

The normal sequence in which signals are transmitted between a given satellite station and the central station is further shown in FIG. 4, where all signals transmitted from the satellite station or received within the satellite station are shown in the upper portion of that figure, while that transmitted from or received by the central station are shown in the lower portion. In FIG. 4 it may again be seen that all communications start within a satellite station at the point where the satellite station, having recognized it has data which is appropriate to transmit, begins a dialing sequence such as shown in box 90 in FIG. 2b. At this point the dialing signal is sent from the satellite station as shown in region 270 in FIG. 4. When the central station picks up, causing the ringing signal to be terminated as indicated at line 272, the central station then transmits its carrier (high) signal as indicated in region 274. The detection of that signal, indicated at line 276, then causes the satellite station carrier to begin. This in turn initiates a 2 second waiting period indicated at region 278, during which the transmission line settles down, after which the message is transmitted from the satellite to the central station as indicated at region 280. At the end of the message transmission period an end of transmission (E.O.T.) signal is transmitted as indicated at line 282, upon receipt of which, the central station transmits an acknowledgment signal together with ongoing time and updated next reporting time signals, etc. as indicated in region 284. Upon completion of such transmissions an end of transmission signal is transmitted from the central station as indicated at line 286, upon receipt of which the satellite station acknowledges the end of transmission signal as indicated in region 288. At that point the satellite station hangs up as indicated at line 290, thus terminating the transmission of the satellite carrier indicated at line 292. This in turn causes the central station to detect the loss of that carrier as indicated in zone 294, causing the central station to hang up as indicated at line 296, thus also terminating the transmission of the central station carrier as indicated at line 298.

In a preferred embodiment of the present invention, the signals involved in the communications between a satellite and the central station are all handled in a digital mode. A particularly preferred format for such digital signals is shown in the succession of signals set forth in FIG. 5. It may be seen in the top portion of FIG. 5 that a typical transmission from a satellite station, such as shown in the region 280 in FIG. 4, would first comprise a short period during which the carrier alone is sent and detected by the central station as indicated at region 300. Subsequent to that, a sync signal 302 would then be transmitted, thus enabling the central station and the satellite station to be synchronized with each other such that subsequent digital data may be properly processed. Upon completion of the sync signal, a "carriage return" signal 304 is transmitted. Thus, when the data is ultimately processed by the central station and caused to be outputted into an auxiliary printer display device or the like, the display will appropriately initiate the display of the next received data at the left margin of the display unit. Next, an identification code bit is transmitted as described hereinbelow in conjunction with FIG. 6. The particular identification code transmitted at the beginning of a given message would thus indicate that the next block 306 identifies the satellite station then transmitting. Upon completion of the address code within block 306, another carriage return signal 307 would be transmitted. Next, a second identification code 308 would be transmitted, the particular code being indicative of the nature of the actual data next to be transmitted. Accordingly, such data is then transmitted, as indicated in field 310, the number of bits within that field depending upon the type of data then being transmitted. In the present preferred embodiment, the particular encoding format utilized enables the transmission of such variable length fields. In a like manner, additional data will then similarly be sent, each field of data being initiated by a carriage return signal 312, a particular identification code signal 314, each again being indicative of the specific type of data subsequently to be transmitted, and a variable length field 316 within which the specific data is included. Subsequent to the last transmitted fields, a final carriage return signal 318 is transmitted, followed by an end-of-message 320, a two digit parity code 322, and an end of transmission 324.

In a similar manner, as indicated in the center portion of FIG. 5, a typical transmission from the central station in reply to the satellite station transmission previously outlined above, will first consist of a synchronization code 330, which signal as indicated above insures that the satellite station and the central station are properly synchronized so as to insure appropriate processing of the data. Subsequently, a carriage return signal 332 is transmitted, followed by an acknowledgment signal 334, which signal in turn is followed by a second carriage return signal 336. The actual transmission of data from the central station is likewise initiated by an appropriate identification code signal 338, followed by the transmission of data within a variable length field 340. Additional data as necessary is then subsequently transmitted, each being preceded by an appropriate identification code 342 and variable length fields 344 as necessary. Upon completion of the transmission of the last data to be transmitted, a final carriage return signal 346 is transmitted, followed by an end of message signal 350, a two digit parity code 352, and an end of transmission signal 354.

The completion of transmissions are initiated within the satellite station as indicated at the bottom of FIG. 5.

It will there be seen that such a transmission includes a sync signal 356, a carriage return signal 358, an acknowledgment signal 360 indicating that all data has been properly received within the satellite station, and an end of transmission signal 362. Upon receipt of that signal, the satellite station then hangs up as indicated at line 290 of FIG. 4, thus causing the satellite station to lose carrier, the subsequent detection of that loss of character then ultimately causing the central station to similarly hang up.

Figure 6:
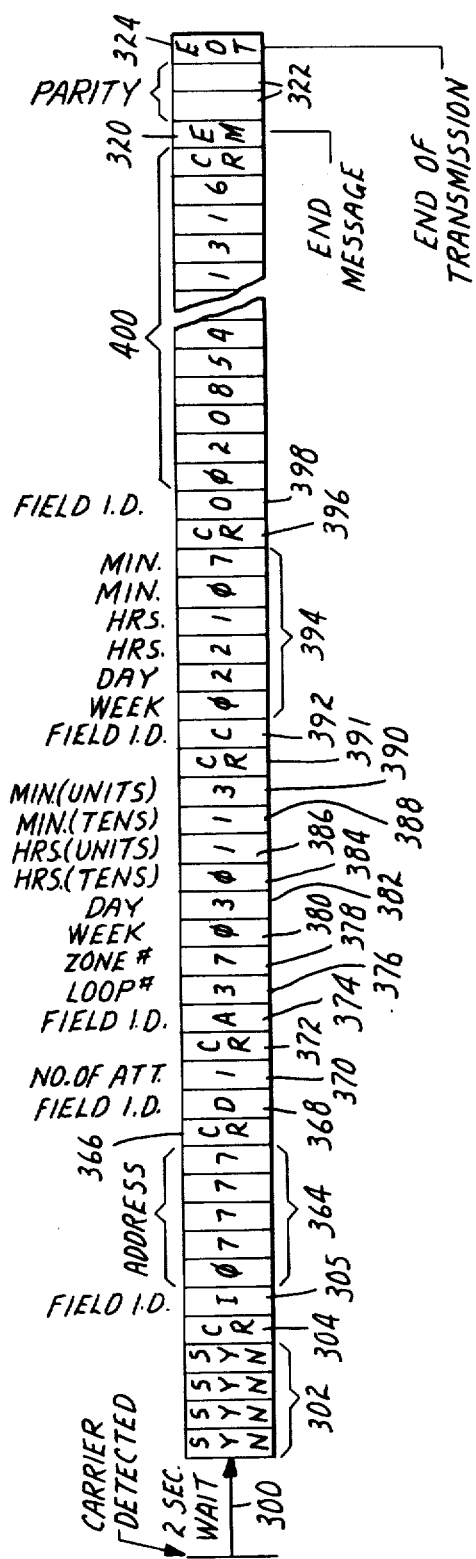
FIG. 6 is a diagram of a preferred format for a typical alarm signal generated within a satellite station.

FIG. 6 sets forth in more detail a typical alarm transmission message transmitted from a satellite station in a digitally encoded format. As is there shown, subsequent to the transmission of the carrier signal and a 2-second wait 300 associated therewith, allowing the communication network to "settle-down", a sync signal 302 is transmitted, as is also indicated in FIG. 5. Subsequent to the transmission of a carriage return signal 304, an identification code 305 is then transmitted, the particular code being indicative of the data next to be transmitted. Each identification code is desirably a unique alphabetic letter, the particular letter being selected to provide a mnemonic representation of the particular type message next to be transmitted. The following identification codes, while preferable, are exemplary of various identification codes which may be used:

A—Alarm
B—Battery Dying
C—Close - store closing
I—Satellite Address number
L—Low battery capacity
O—Open - store open
P—Phone # (see note)
R—Restore
S—Schedule Change
T—Trouble
Z—Close w/Zone out
D—No. of Dial Attempts (1-8)

As indicated in FIG. 6, the use of the identification code I in Block 305 thus indicates that the next data to be transmitted identifies the given satellite then in communication. As is indicated in the next series of blocks 364, the given satellite then in communication would have the address number 7777. The end of that transmission is followed by a carriage return signal 366. The next series of data is again initiated by a field identification code 368 in which the letter D signifies that the data next being transmitted is indicative of the number of dialing attempts that the current transmission represents. The specific number then being attempted is indicated at block 370. After eight unsuccessful attempts, the satellite station will "go to sleep" for 30 minutes and will then try again, this cycle being continued until an acknowledgment signal is ultimately transmitted from the central station. The completion of that signal is again indicated by a carriage return signal 372, followed by another field identification signal 374, in this instance, the letter A indicating an actual alarm situation. The subsequent blocks 376, 378, 380, 382, 384, 386, 388 and 390 thus indicate that an alarm has occurred in loop No. 3, zone 7, at the particular week, day, hour and minutes there specified. The completion of such an alarm signal is then indicated by a carriage return signal 391 as described hereinabove. The next data transmitted is again indicated by a field identification code 392, the letter C indicating a "store closing". The next 5 digit block, 394, is thus indicative of the week, day, hours and minutes at which the store closing signal was transmitted. The completion of that data block is again indicated by a carriage return signal 396 and the initiation of the next data block again indicated by another field identification code 398. Such a sequence of data transmissions continues as indicated in the general region 400 until all data previously stored or available for transmission from the satellite station has been transmitted. Upon completion thereof an end of message signal 320, parity check code 322, and end of transmission signal 324, respectively, are then transmitted as indicated in FIG. 5.

In analogous fashion, a typical time update response from the central station is set forth in FIG. 7. It may there be seen that such a transmission begins, as indicated above, with a sync signal 404. Such a signal is followed by a carriage return signal 406 and an acknowledgment signal 408 which thus indicates to the satellite station that its previous transmissions have been appropriately received. This is in turn followed by an additional carriage return signal 410, which in turn is followed by an identification code unique to the type of data being transmitted from the central station. For example, such codes would include the following:

K—Set clock time
V—Primary phone #
Q—Secondary phone #
E—Next report time

Thus, as indicated in FIG. 7, a first field identification code K in block 412 would indicate that the data next to be transmitted is to be utilized by the satellite station to set the local clock within that satellite. As there indicated, the on going time would thus be week—0, day—4, hour and minutes 0043, respectively, as indicated in the grouped block 414. Upon completion an additional carriage return signal 416, end of message signal 418, parity signal 420, and end of transmission signal 422 would then be transmitted. As may readily be recognized, a similar transmission indicating the next required reporting time would be preceded by a field identification No. E, followed by the appropriate digitally encoded time information.

In like fashion, a typical response from the central station instructing the satellite station to change its primary telephone number is set forth in FIG. 8. Such a transmission again is initiated by a sync signal 424, followed by carriage return signal 426 and acknowledgment signal 428 and additional carriage return signal 430. The next field identification code V in block 431 is thus indicative of a primary telephone number. A fixed field 432 which is 30 digits long then follows which represents a 15 digit telephone number, right justified (blocks 434) followed by an additional 15 digit sequence (blocks 436) in which the same number is set forth in hexadecimal reciprocal reverse order. Upon completion of such a fixed field, the end of the message is again indicated by the end-of-message signal 350, a 2-digit parity signal 352, and the end of transmission signal 354.

It may thus be seen that the sequence of transmissions between a given satellite station and the central station may be varied depending upon the specific data to be transmitted and the desired encoding formats utilized. Accordingly, variations of conventional encoding formats, alarms and other signal sources and the like may similarly be utilized.

Under typical conditions an industrial or a commercial establishment might have two or three non-routine transmissions in a year's time. These might include a true burglary, a false alarm (caused by people or equipment), a failing battery, etc. The preponderance of data is routine, such as the normal opening and closing time of the establishment. The management of the establishment may wish to know when the actual openings and closings occur, but it is not necessary that the Central Station know as they happen (i.e., in real time). This then allows this routine data to be sent to the Central Station at predetermined times so as to space the traffic uniformly throughout the day. Conventional "interrupt only" systems that function in real time create a traffic loading problem at 'peak' times of the day; much in the same way as electric power utilities experience peak demands. Capital equipment expenditures are based on peak demand. The system described herein allows distribution of the demand thus lowering the cost of telephone lines, computers, and personnel, with plenty of time interspersed to handle the very low percentage of non-routine signals.

In the specific embodiment described hereinabove, each satellite station contains a single chip microcomputer such as type 1802 manufactured by RCA Corp., which includes as an integral part thereof, the functions of memory, I/O, central processors, local clock, and the like. In like fashion, the receiver and transmitter of each satellite station are contained within a single-chip MODEM, such as type MC14412 manufactured by Motorola Semiconductor Products, Inc. In contrast, the central station consists of a receiver-transmitter made from the Motorola Micromodule System. That is interfaced to a Tandem, Inc. model 16 computer which contains the host CPU, memory and master clock.

Having thus described the present invention, what is claimed is:

1. A system enabling bidirectional communications over a switched data transmission network between a central station and a plurality of satellite stations wherein
   A. said central station comprises
      (i) master clock means for maintaining an ongoing time including the current week, day, hour, and minute,
      (ii) memory means having designated addresses associated with storage locations at which data signals associated with each satellite station are stored, said signals including a unique satellite station address code which is different for each satellite station, and a predetermined time setting which is also different for each satellite station and establishes the routine time at which each satellite station is required to initiate communication with the central station,
      (iii) means for receiving from each said satellite station data signals including a said address code whereby a said bidirectional communication is initiated by the communicating satellite station having that address code,
      (iv) means for transmitting data signals to a given satellite station identified by its address code, and
      (v) central processing means including
         (a) means coupled to said memory means for inputting at said storage locations data signals including said predetermined time setting and said satellite station address code for each satellite station,
         (b) means for initiating a storage location at its designated address within said memory means in response to receipt of a transmission originating within said communicating satellite station, and containing its satellite station address code, (c) means for routing said received data signals to an accessed storage location for storage thereat, (d) means responsive to said master clock means and to said memory means for providing instructions for the communicating satellite station, said instructions including an updated ongoing time signal and an updated predetermined time setting, and coupled to said transmitting means for enabling transmission of said instructions to the communicating satellite station, and (e) means for terminating said communication; and wherein B. each satellite station comprises (i) local clock means responsive to said instructions from said central station for controlling the initiation of communications with the central station at the time corresponding to the predetermined time setting associated with that satellite station, (ii) store and forward means for accumulating data for subsequent transmission to said central station, (iii) means for transmitting signals including the address code for that satellite station and routine and non-routine data to said central station, (iv) means for receiving data signals from said central station, and (v) data processing means for controlling the flow of data signals within the satellite station and for controlling the transmission of data signals to and receipt of data signals from said central station, said processing means including (a) means responsive to an updated ongoing time signal received from said central station for synchronizing said local clock means and responsive to an updated predetermined time setting received from the central station for adjusting said local clock means to the updated predetermined time setting, (b) means for processing routine and non-routine data derived from external sensors including informationas to the nature of the derived data and for inputting such processed data into the store and forward means, (c) means responsive to a signal from said local clock means when the ongoing time and the predetermined time setting are the same for activating said transmitting means of the satellite station to thereby initiate transmission to said central station at the time determined by the predetermined time setting, and to enable transmission of accumulated routine data, and (d) means responsive to non-routine data for initiating said transmission to said central station at any time on a priority interrupt basis to enable immediate transmission of said non-routine data, whereby communications between each satellite station and the central station are initiated by the satellite station, routine data are received and held within each of said satellite stations and are transmitted to said central station at different predetermined times, and non-routine, emergency data are immediately transmitted to the central station to enable immediate central response to such emergency data.

2. A system according to claim 1 wherein said central processing means of the central station comprises means for providing a first acknowledgment signal verifying receipt of initial data signals from a given satellite station.

3. A system according to claim 1 wherein said central station further comprises means for responding to said received data signals for providing a second acknowledgment signal indicating the incomplete receipt of all said data signals and wherein each of said satellite stations further comprise means responsive to said second acknowledgment signal for retransmitting said data signals to said central station.

4. A system according to claim 1 wherein said central station further includes means for verifying proper storage of data signals at a storage location having a given designated address and for rerouting such data signals to said memory means in the event improper storage was indicated.

5. A system according to claim 1 wherein said central station further comprises means for receiving a third acknowledgment signal from a communicating satellite station verifying receipt of said updated signals from said central station.

6. A system according to claim 1, wherein said means for providing instructions of the central station further comprises means for providing data signals corresponding to a changed primary telephone number, which signals cause the communicating satellite station to transmit to the central station at the changed primary telephone number when it next initiates communications.

* * * * *

UNITED STATES PATENT AND TRADEMARK OFFICE
CERTIFICATE OF CORRECTION

PATENT NO. : 4,447,872

DATED : May 8, 1984

INVENTOR(S) : Eugene M. Nothaft

It is certified that error appears in the above—identified patent and that said Letters Patent is hereby corrected as shown below:

Col. 2, lines 17-18: delete "ongoing time settings, while" and insert --an on-going time setting indicative of the current week, day, hour and minute and a plurality of predetermined time settings each of which is different from the others and at which a given satellite station is required to initiate communications back to the central station further,--.

Col. 6, line 6: after "in" insert --block--.

Col. 6, line 29: "where" should read --whereat--.

Col. 6, line 29: "bolck" should read --block--.

Col. 14, line 64: after "initiating" insert --access to--.

Signed and Sealed this

Twenty-fourth Day of July 1984

[SEAL]

Attest:

*Attesting Officer*

GERALD J. MOSSINGHOFF

*Commissioner of Patents and Trademarks*